United States Patent [19]
Uhlyarik

[11] 3,884,484
[45] May 20, 1975

[54] CONVERSION SYSTEM FOR PEDAL-OPERATED CYCLES
[76] Inventor: Emanuel J. Uhlyarik, 23309 Westbury Dr., St. Clair Shores, Mich. 48079
[22] Filed: May 1, 1973
[21] Appl. No.: 356,078

[52] U.S. Cl. ............................................. 280/7.12
[51] Int. Cl. ......................................... B62k 13/00
[58] Field of Search .......... 280/7.12, 7.14, 285, 286

[56] References Cited
UNITED STATES PATENTS

| 566,438 | 8/1896 | Anderson et al. | 280/7.14 |
| 590,351 | 9/1897 | Wuggenig | 280/7.12 |
| 633,030 | 9/1899 | Nelson | 280/7.14 |
| 638,575 | 12/1899 | Guay | 280/7.14 |
| 764,442 | 7/1904 | Erickson et al. | 280/7.14 |
| 1,135,927 | 4/1915 | Rosendahl | 280/285 |
| 1,275,460 | 8/1918 | Newberry | 280/286 |
| 1,281,980 | 10/1918 | Kostewich | 280/7.14 |
| 1,560,702 | 11/1925 | Le Camus | 280/286 |
| 3,480,096 | 11/1969 | Hammitt | 280/7.12 X |
| 3,561,777 | 2/1971 | Geis | 280/7.12 |

Primary Examiner—David Schonberg
Assistant Examiner—David M. Mitchell
Attorney, Agent, or Firm—D. Edward Dolgorukov

[57] ABSTRACT

Improvement in a conversion system for pedal-operated cycles for converting a summer use cycle to a winter use vehicle having respective forward and rearward ski mechanisms and a winter use rear driver wheel mechanism, said forward ski mechanism constructed to be affixed to the front fork of said cycle in lieu of the front summer wheel thereof, and both said rear ski mechanism and said rear driver wheel mechanism constructed to be affixed to the frame of said cycle in lieu of the rear summer wheel thereof, the rear ski mechanism comprising a pair of skis, the driver wheel mechanism comprising a driver wheel operative between the skis, said improvement comprising a mechanism for rockably mounting said forward ski mechanism on said front fork, a mechanism for limiting said rocking movement, both backward and forward, in respect to said front fork, a mechanism fast to the cycle frame defining a circularly arcuate slot, the axle of the driver wheel moveable up and down in the slot, a compression spring on each side of said driver wheel for yeildably pressing the latter downwardly to provide forward propulsion of the winter use vehicle, and a mechanism for adjusting the compression of each spring.

1 Claim, 8 Drawing Figures

PATENTED MAY 20 1975 3,884,484
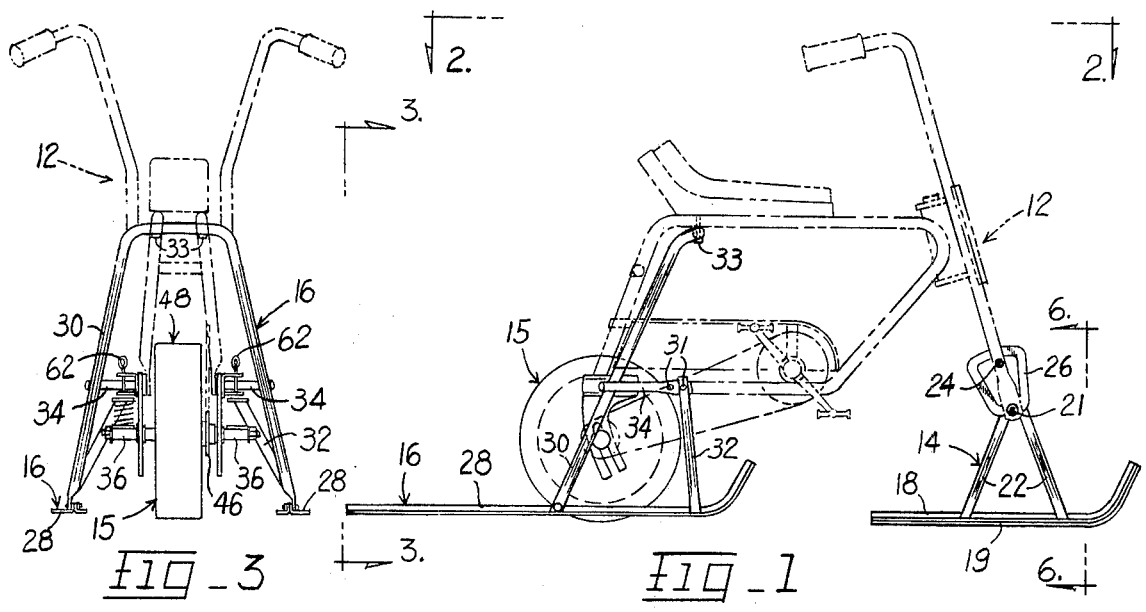
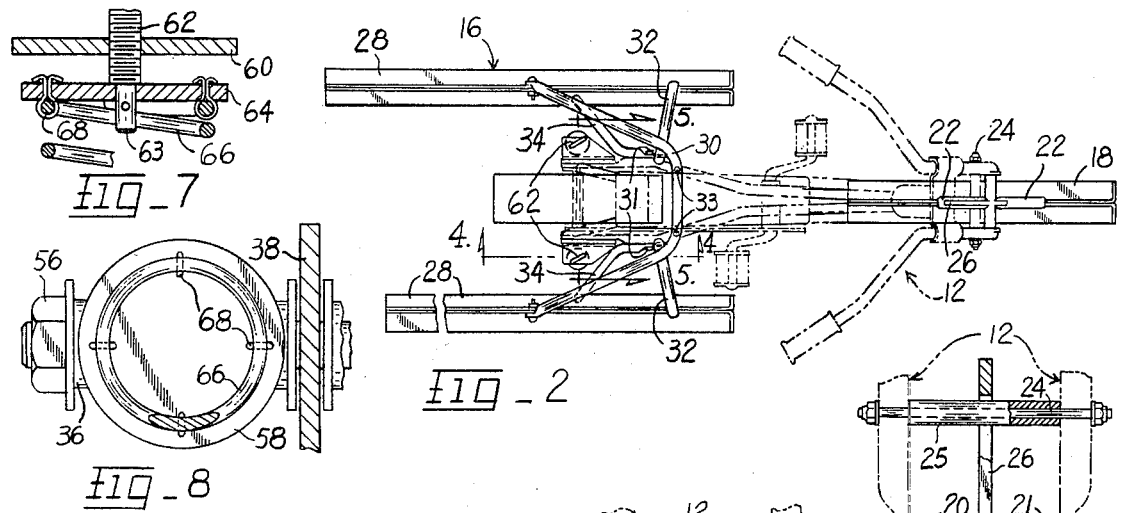
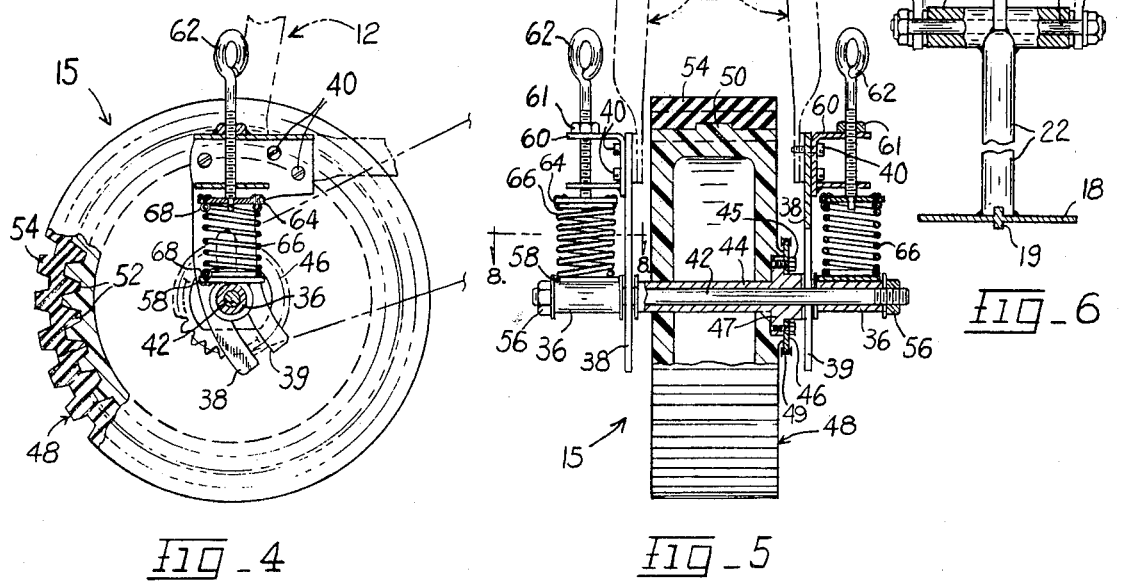

CONVERSION SYSTEM FOR PEDAL-OPERATED CYCLES

My invention relates to pedal-operated cycles.

In the prior art it has been proposed to convert pedal-operated cycles from summer to winter use but such proposals have not been practical because they maintain the summer use vehicle substantially as it is resulting in a winter use vehicle which is not really capable of traversing snow-covered irregular terrain.

The principal object of my invention is to provide improvements in a conversion system for pedal-operated cycles to convert such cycles from summer to winter use to enable a user thereof to pedal across snow-covered irregular terrain.

The foregoing object of my invention and the advantages thereof will become apparent during the course of the following description, taken in conjunction with the accompanying drawings, in which:

FIGS. 1, 2 and 3 are, respectively, side and rear elevational and top plan views of a conversion system for pedal-operated cycles embodying my invention;

FIGS. 4 and 5 are, respectively, fragmentary vertical sectional views of the structure of FIG. 2 taken on the lines 4—4 and 5—5 thereof, respectively;

FIG. 6 is a fragmentary vertical sectional view of the structure of FIG. 1 taken on the line 6—6 thereof;

FIG. 7 is a fragmentary enlarged view of a portion of FIG. 4; and

FIG. 8 is a horizontal sectional view of the structure of FIG. 5 taken on the line 8—8 thereof.

Referring to the drawings in greater detail, said embodiment is shown attached to a conventional pedal-operated bicycle 12 illustrated in broken lines having the summer front and rear bicycle wheels thereof removed. Said embodiment comprises a forward ski mechanism 14 which replaces said summer front wheel and both a winter driver wheel mechanism 15 and rearward ski mechanism 16 which replace said summer rear wheel.

Said forward ski mechanism 14 comprises a single ski 18 having upstanding struts 22 made fast thereto which ski 18 is rotatably supported for limited rocking motion by a sleeve 20 supported on and made fast to the upper end of said struts 22. Said sleeve 20 is rotatably carried on a front axle 21 held, as shown, in the conventional front fork of the bicycle 12. The lower end of each strut 22 is welded to a central longitudinally extending rib protruding from the top surface of said ski 18. Said ski 18 has a central longitudinally extending rib 19 protruding from the under surface thereof to assist said ski 18 in steering the winter use vehicle. A pin 24 covered with a sleeve 25 is fastened between the legs of the conventional front fork of said bicycle 12 above said front axle 21 to serve as a stop for a closed loop bar 26 which is made fast to said sleeve 20.

Said rearward ski mechanism 16 comprises a pair of skis 28 which are made fast to the frame of said bicycle 12 by struts 30, 32, and 34 which are joined to each other, to the skis 28 and to the frame of said bicycle 12 as shown. The lower ends of the strut 30 are bolted, respectively, to central longitudinally extending ribs protruding from the top surfaces of said skis 28. The lower end of each strut 32 is welded to the respective rib on one of the skis 28. The struts 34 are welded, respectively, to opposite sides of the struts 30 and to the struts 32. Each junction of a strut 34 and a strut 32 is bolted, as at 31, to a lower horizontal frame member of said bicycle 12. The center portion of the strut 30 is bolted, as at 33, to an upper horizontal frame member of said bicycle 12 beneath the vehicle seat.

Said driver wheel mechanism 15 comprises a pair of frame members 38 fastened, as at 40, to the legs, respectively, of the conventional rear fork of said bicycle 12. Each frame member 38 has a downward facing open circular arcuate slot 39 therein. In fastening the frame members 38 to said rear fork of the bicycle 12 the same are positioned so that the slots 39 are spaced from the center of the pedal sprocket of the bicycle 12 the same distance the axle of said summer rear wheel normally would be, i.e. said slots 39 have a common center of curvature at the axis of rotation of the conventional pedal sprocket of the bicycle 12. Said slots 39 hold therein a rear axle 42 for said driver wheel mechanism 15 which axle 42 rotatably carries thereon three sleeves, i.e. a center sleeve 44 disposed between thrust washers between said frame members 38 and a pair of outer sleeves 36. A driver wheel 48 which, in the instance, is hollow is made fast to said sleeve 44 by being bonded thereto and by a recess formed in one side of said driver wheel 48 and by a flange 47 formed on one side of said sleeve 44. Said flange 47 sets in said recess and both said flange 47 and said recess have complementary top and bottom flats to increase the torque applicable to the hollow body of the wheel 48 from the sleeve 44. Said sleeve 44 is made fast to a rear sprocket 46 by bolting the latter, as at 45, to the flange 47 on the former for rotatably driving the former and hence said wheel 48. The pedal driven chain which rotatably drives said sprocket 46 is indicated at 49. Said driver wheel 48 may be fabricated as an integral assembly with said sprocket 46 and said axle 42 by first forming said sprocket 46 and said axle 42 as an integral metal axle assembly and then by molding the hollow plastic body of said driver wheel 48 about said metal axle assembly so as to bond said hollow plastic body to said metal axle assembly to form an integral driver wheel assembly. Said wheel 48 has circumferentially formed on the hollow body thereof respective tire-holding structures 50 and 52 for removably holding a rubber tire 54 on said wheel 48. The structure 50 holds the tire 54 from sideways movement while the structure 52 holds the tire 54 from circumferential movement in respect to the wheel 48.

Each sleeve 36 is disposed between thrust washers and is held in place on the axle 42 by a nut 56 threaded on the respective end of said axle 42. Disposed above the axle 42 is a pair of brackets 60 fastened, respectively, to the frame members 38, as by welding. Each bracket 60 consists of vertically spaced apart arms, the top one of which carries fast thereon a nut 61 which threadably engages an eye screw 62, while the lower arm has a clearance aperture therein for said eye screw 62. A pair of plates 58 and 64 are provided beneath each bracket 60 and a pair of compression springs 66 are fastened, as by eye pins 68, between corresponding ones of the plates 58 and 64. Each said eye pin 68 has two arms which extend through the respective one of the plates 58, 64 and are spread apart and bent over like a cotter pin. Four pins 68 are used to fasten each end of each spring 68 to the respective one of the plates 58, 64.

Each eye screw 62 has a reduced diameter shank 63 formed on the lower end thereof which projects through a central circular aperture in the respective plate 64. Each said shank 63 is pinned, as shown in FIG. 7, in relation to its respective plate 64 so that as said eye screw 62 is axially rotated said plate 64 does not rotate but is moved vertically up or down to vary the compression on the respective spring 66. The downward pressing action of the compression springs 66 and the stabilizing function of the eye screws 62 are assisted to a considerable extent by said lower arms on the brackets 60. Said means for varying the spring pressures on the pair of springs 66 are provided to compensate (within the weight range of the particular cycle) for differences in elevation caused by depressions or raised bumps in said snow-covered irregular terrain. Besides differences in elevation the yieldable downward pressing of the driver wheel 48 also compensates for differences in traction obtainable on various types of snow covered irregular terrain traversable by said winter use vehicle, e.g. terrain covered with a soft dry snow, a heavy wet snow, or extensive ice. The springs 66 are selected for the particular weight range of the cycle so as to have a downward pressing force which will force the axle 42 and hence the driver wheel 48 downwardly to produce adequate traction for forward propulsion on the various types of snow covered irregular terrain.

In use of said embodiment, the summer front wheel of the bicycle 12 is removed and replaced with said forward ski mechanism 14, the front axle 21 for which is disposed in the same place in the front fork of the frame of said bicycle 12 as the axle of said summer front wheel. The chain 49 is disconnected from the sprocket of the rear summer wheel of the bicycle 12. Said summer wheel is removed and replaced with both said winter driver wheel mechanism 15 and rearward ski mechanism 16. It should be noted that the axle 42 for the driver wheel 48 is held in the slots 39 by reason of the fastening of the springs 66 to the plates 58 and 64 and of the latter, respectively, to the sleeves 36 and eye screws 62. Said axle 42 is positioned considerably lower than the where the summer wheel axle is held as a consequence of the smaller diameter of said driver wheel 48 in relation to said summer bicycle wheel. The chain 49 is connected over said sprocket 46 so that said winter use vehicle is capable of being propelled by a user thereof pedaling the same to cause said sprocket 46 to be chain driven by rotatably driving the front sprocket of said bicycle. As said winter use vehicle traverses snow-covered irregular terrain the front ski 18 which steers the vehicle is capable of manuevering up and down irregularities in elevation of said snow-covered terrain because said front ski 18 can rock about the axis of said front axle 21. In extreme clockwise and counter-clockwise positions (as viewed in FIG. 1) of said front ski 18 the front and back legs of the bar 26 strike the sleeve covered pin 24 to limit the rocking motion of said front ski 18. The driver wheel 48 is capable of maintaining traction for forward propulsion in spite of said irregularities in elevation because it is yieldably pressed downwardly in the slots 39 by the pair of springs 66. In such use of said embodiment the plates 58 move up and down in respect to the plates 64. The downward pressing force of the springs 66 is adjusted for the weight of the particular user of said embodiment by turning the eye screws 62 to vary the compression of said springs 66. In such adjustment of said embodiment the plates 64 move up or down in respect to the plates 58. In use of said embodiment in spite of such upward and downward movement of the driver wheel 48 to maintain traction for forward propulsion the spacing for the given cycle 12 between the front sprocket of the bicycle 12 and said sprocket 46 is maintained since the center of the radius of curvature of said slots 39 is the axis of rotation of the front sprocket of the bicycle 12.

It will thus be seen that there has been provided by my invention improvements in a conversion system for pedal-operated cycles in which the object hereinabove set forth, together with many thoroughly practical advantages has been successfully achieved. While a preferred embodiment of my invention has been shown and described, it is to be understood that variations and changes may be resorted to without departing from the spirit of my invention as defined by the appended claims.

What I claim is:

1. An improvement in a conversion system for pedal-operated cycles of the type having a frame and including a front fork, and a rear fork and having a front axle and a rear axle mounted thereon, each of said axles carrying a conventional bicycle wheel, said improvement being for the conversion of said cycle from its traditional summer use to a winter use sled having forward and rear ski mechanisms, with said forward ski mechanism being fixedly but removably mounted on said front fork in place of said front wheel, said rear ski mechanism being fixedly but removably mounted to said frame at the rear fork thereof, and a winter use rear driver wheel mechanism being affixed to the rear fork of said cycle in lieu of the rear wheel thereof, said improvement comprising improved rear ski, rear driver wheel, and front ski mechanisms, and including a rear ski mechanism having two skis mounted on opposite sides of said winter use rear driver wheel mechanism, a frame member joining said two skis together which extends upwardly above and transversly across said rear driver wheel, said transverse portion of said frame member joined to said cycle frame above said rear driver wheel mechanism, said driver wheel mechanism including a pair of brackets fixedly mounted to said cycle frame on opposite sides of the rear fork thereof, said bracket means defining open-ended downwardly extending circularly arcuate slots with the center of said arc being at the center of the pedal sprocket of said cycle, with the axle of said winter use rear driver wheel movable up and down in said slot means, each of said brackets including a spring mounting means above said slot, a pair of springs each having an upper and lower end with one of said springs mounted on each side of said rear driver wheel and adapted to exert a downward force thereon, with the upper end of each of said springs adjustably attached to said spring mounting means, so that the tension on said springs, and thus the downward force on the driving wheel, can be adjusted depending on ground conditions, and a pair of spring mounting brackets fixedly but rotatably mounted on opposite sides of the axle of said rear driver wheel with the lower end of each of said springs fixedly mounted thereto, and means for mounting said forward ski mechanism on said front fork to allow limited rocking movement thereof, said limiting means including a closed loop member having forward and rearward portions fixedly mounted to said forward ski mechanism, a pin mounted in said front fork above said front axle with said closed loop member being adapted to strike said pin with its forward or rearward portions when the desired limits of movement of such forward ski mechanism are reached.

* * * * *